June 9, 1931.   E. W. NEALE ET AL   1,809,488
DOUBLE SPINDLE MOLDING MACHINE
Filed March 31, 1930
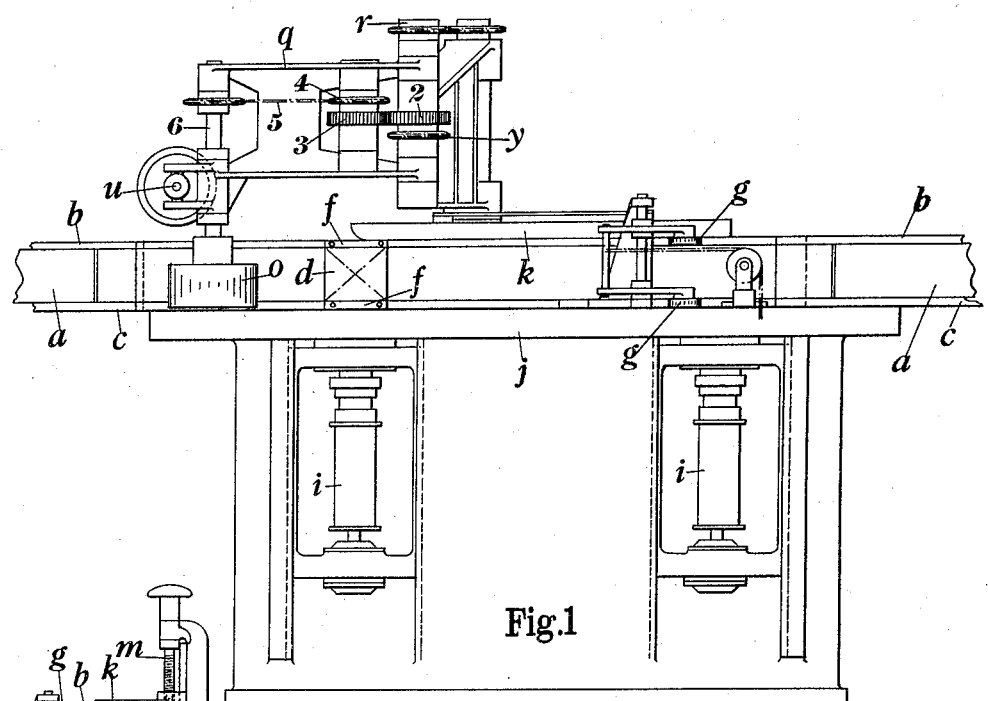
Fig.1
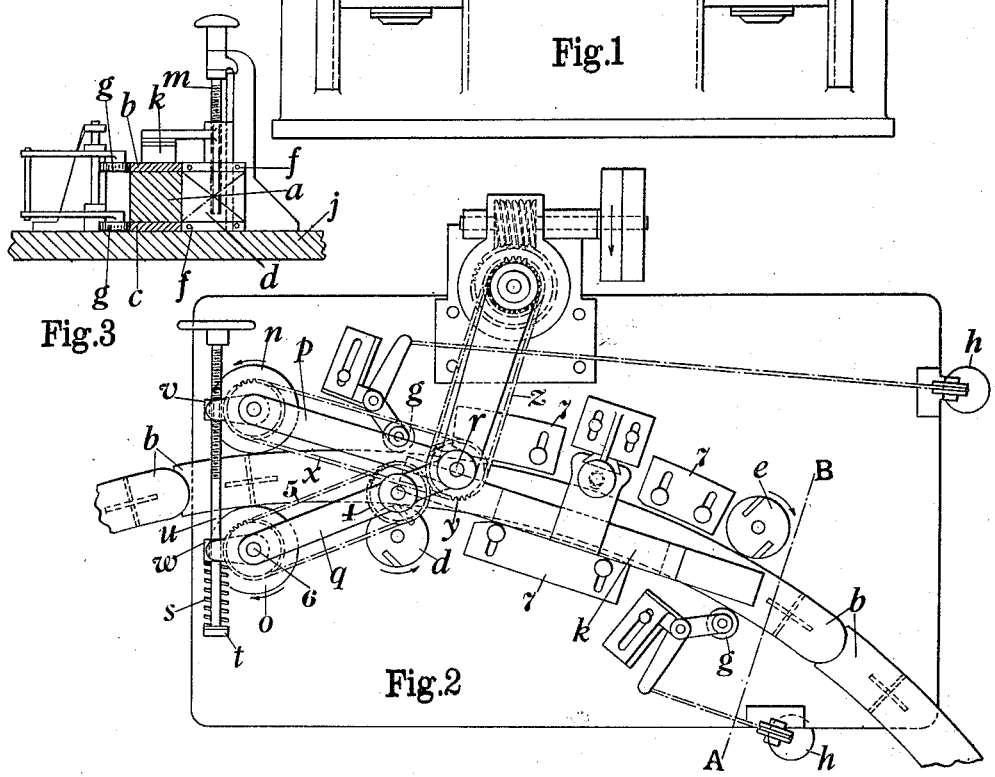
Fig.3
Fig.2
E. W. Neale & A. H. Handley
INVENTORS
By: Marks & Clerk
ATTYS.

Patented June 9, 1931

1,809,488

UNITED STATES PATENT OFFICE

EDGAR WALTER NEALE AND ARTHUR HENRY HANDLEY, OF BIRMINGHAM, ENGLAND

DOUBLE SPINDLE MOLDING MACHINE

Application filed March 31, 1930, Serial No. 440,607, and in Great Britain April 4, 1929.

This invention relates to double spindle molding machines, and has for its object to provide improved means for guiding and feeding pieces of material of irregular, curved or other shape through the machine whilst being operated upon.

The invention comprises a continuous feed for the material to be machined in which driven feed rollers operate at the opposite sides of the material and are adapted to position themselves to suit the shape of the material whilst maintaining the continuous drive thereto.

The invention further comprises the provision of two feed rollers on radial arms adjustably and flexibly anchored together and pivoted about a common axis about which they can turn to allow the rollers to follow the contour of the work.

The invention further comprises the arrangement of the work with templates which form a continuous linkage system by which the work is pushed between the cutter blocks, with rollers acting upon the templates opposite each cutter block to hold the templates against guide collars on the cutters, means for holding the machine down on the machine table and positively driven self positioning feed rollers for the work.

Referring to the accompanying sheet of explanatory drawings:—

Figure 1 is an elevation, Figure 2 a plan view and Figure 3 a sectional elevation on the line A B of Figure 2 illustrating a machine embodying our invention in one convenient form.

The same reference letters in the three views indicate the same parts.

The material $a$ to be machined is carried between top and bottom templates $b$ and $c$ (secured to the material) which fit into one another at their adjacent abutting ends as shown in Figure 2 so as to form a continuous linkage system by which the material is pushed through the machine as hereinafter described. If desired, a bottom or a top template only may be employed.

The cutter blocks are shown at $d$ and $e$, each block being provided with top and bottom guide collars $f$ which bear upon the edges of the templates $b$ and $c$. Rollers $g$ disposed at the opposite sides of the templates to the cutter blocks $d$ and $e$ hold the templates against the guide collars $f$ above and below the cutters to ensure the correct machining of the material. Weights $h$ serve to press the rollers $g$ against the templates as will be understood from the drawings. The cutter blocks are mounted upon spindles $i$ driven by belt or other means in any ordinary manner.

The work is held down on the table $j$ by a top pad $k$ which can be adjusted in position by the screw $m$, see Figure 3.

The feed of the material through the machine is effected by two feed rollers $n$, $o$ disposed at the opposite sides of the material as it enters the machine. Each roller which is preferably rubber covered has its spindle carried by an arm $p$ or $q$ fulcrumed about a vertical spindle $r$. The two arms $p$, $q$ are drawn together by a spring $s$ pressing at one end against a collar $t$ upon a rod $u$ which screws through a collar $v$ pivotally carried by the end of the arm $p$ and at its other end against a collar $w$ pivotally carried by the arm $q$. By turning the screwed rod $u$ so that it threads through the collar $v$, the degree of compression of the spring $s$ can be adjusted to suit the width of material being operated upon or other conditions. The two rollers $n$ and $o$ are positively driven by means of chain drives, the drive to the roller $n$ being by means of the chain $x$ from a sprocket wheel $y$ upon the spindle $r$ rotated by the main driving chain $z$. The spindle $r$ also carries a gear wheel 2 which drives a wheel 3 upon the arm $q$. The wheel 3 has a sprocket wheel 4 associated therewith and from the latter wheel a chain 5 drives the spindle 6 of the feed roller $o$. With the said driving arrangements, the two feed rollers $n$ and $o$ are caused to transmit a positive drive to the opposite sides of the material and as the arms carrying said rollers can turn about the spindle $r$ upon which they are mounted without altering the pressure of the rollers upon the templates, the rollers can adjust themselves in position to suit the character of the work being passed through the machine.

Adjustable approximate guide plates 7 are disposed at the opposite sides of the path to be followed by the material as it passes through the machine.

Our invention provides a self-positioning roller feed for a double spindle molding machine enabling work of any usual shape to be machined at both sides during one passage through the machine.

What we claim is:—

1. In double spindle molding machines, the provision of two feed rollers on radial arms adjustably and flexibly anchored together and pivoted about a common axis about which they can turn to allow the rollers to follow the contour of the work.

2. Feeding mechanism for double spindle molding machines comprising, in combination, feed rollers at opposite sides of the workpieces, two arms pivoted about a common pivot carrying at their outer ends the axes of said rollers, resilient means drawing said arms towards one another to press the rollers against the workpieces, an arm pivotally supported by a fixed pivot carrying at its free end the common pivot of said two arms, and means for positively driving said feed rollers.

3. In feeding mechanism as claimed in claim 2, a chain drive between chain wheels upon the fixed pivot and the common pivot, a chain drive from a chain wheel upon said common pivot to a chain wheel upon the axis of one feed roller, a gear drive from the common pivot to a gear wheel carried by the arm having the other feed roller thereon, and a chain drive from a chain wheel upon said other feed roller axis to a chain wheel on the axis of the gear wheel upon the arm having said other feed roller thereon.

4. Feeding mechanism as claimed in claim 2, in which templates which fit into one another at their abutting ends are secured to the workpieces to produce a continuous linkage system ensuring the propulsion of the workpieces by the feed rollers until they leave the machine.

5. Feed mechanism as claimed in claim 2, in which top and bottom templates are secured to the workpieces and fit into one another at their ends to form the workpieces into a continuous linkage system of articulated sections for propulsion through the machine by one pair of feed rollers.

6. Feeding mechanism as claimed in claim 2, in which top and bottom templates are secured to the workpieces and fit into one another at their adjacent ends to form the workpieces into a linkage system of articulated sections for propulsion through the machine by the one pair of feed rollers, cutter blocks acting upon the workpieces, guide collars above and below the cutter blocks pressing upon the top and bottom templates, and weight impelled rollers also pressing upon the templates to hold them against the guide rollers above and below the cutters.

7. Feeding mechanism for double spindle molding machines, comprising templates forming a continuous linkage system secured to the workpieces to guide them through the machine, rollers above and below the cutter blocks acting upon the templates, and further rollers also acting upon the templates to press them against the rollers above and below the cutter blocks and the workpieces against the cutter blocks, means for holding the work down on the machine table as it travels through the machine, and positively driven self-positioning feed rollers acting at opposite sides of the workpieces to propel them through the machine.

In testimony whereof we have signed our names to this specification.

EDGAR WALTER NEALE.
ARTHUR HENRY HANDLEY.